(12) United States Patent
Chen et al.

(10) Patent No.: US 7,021,197 B2
(45) Date of Patent: Apr. 4, 2006

(54) HOT BEVERAGE MACHINE

(75) Inventors: Yuen Chin Andrew Chen, Tai Po (CN); Kwan Fai Lui, Tai Po (CN)

(73) Assignee: Electrical & Electronics Ltd., Tai Po (HK)

( * ) Notice: Subject to any disclaimer, the term of this patent is extended or adjusted under 35 U.S.C. 154(b) by 139 days.

(21) Appl. No.: 10/622,789

(22) Filed: Jul. 18, 2003

(65) Prior Publication Data
US 2005/0011364 A1   Jan. 20, 2005

(51) Int. Cl.
*A47J 31/00* (2006.01)
(52) U.S. Cl. .............. 99/291; 99/300; 99/305; 99/290; 99/284
(58) Field of Classification Search .............. 99/291, 99/300, 305, 306, 307, 284, 290
See application file for complete search history.

(56) References Cited

U.S. PATENT DOCUMENTS

| | | | |
|---|---|---|---|
| 4,603,620 A * | 8/1986 | Daugherty | 99/300 |
| 4,676,149 A | 6/1987 | Stover | |
| 4,725,714 A * | 2/1988 | Naya et al. | 392/480 |
| 5,080,008 A | 1/1992 | Helbling | |
| 5,083,503 A | 1/1992 | Van Hattem et al. | |
| 5,240,033 A | 8/1993 | Erdmann et al. | |
| 5,724,883 A * | 3/1998 | Usherovich | 99/290 |
| 5,778,765 A * | 7/1998 | Klawuhn et al. | 99/290 |
| 5,829,340 A * | 11/1998 | Yang | 99/290 |
| 5,862,738 A | 1/1999 | Warne | |
| 5,901,634 A | 5/1999 | Vancamp et al. | |
| 6,000,317 A * | 12/1999 | Van Der Meer | 99/282 |
| 6,142,063 A | 11/2000 | Beaulieu et al. | |
| 6,279,460 B1 * | 8/2001 | Pope | 99/299 |
| 6,298,769 B1 | 10/2001 | Stettes et al. | |
| 6,439,105 B1 | 8/2002 | Ford | |
| 6,474,221 B1 * | 11/2002 | Shaanan et al. | 99/289 R |

FOREIGN PATENT DOCUMENTS

WO    WO 02/074144 A2    9/2002

\* cited by examiner

*Primary Examiner*—Reginald L. Alexander
(74) *Attorney, Agent, or Firm*—Alix, Yale & Ristas, LLP

(57) ABSTRACT

A multifunctional beverage machine designed for automatically making various kinds of hot drinks, such as coffee, tea, hot chocolate or soups, and incorporates an advanced microprocessor control system such that multifunctional appliance operation can be easily be achieved via a one-touch button. The multifunctional beverage machine may include a removable water tank can hold a sufficient capacity of water so that the machine can make many cups of various drinks without refill. In addition, the multifunctional beverage machine has two or more independent brewing chambers installed in the machine allowing it to make different kinds or different combination of drinks in one operation.

16 Claims, 12 Drawing Sheets

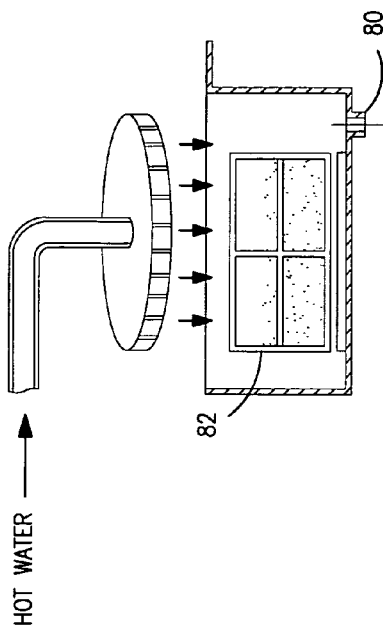
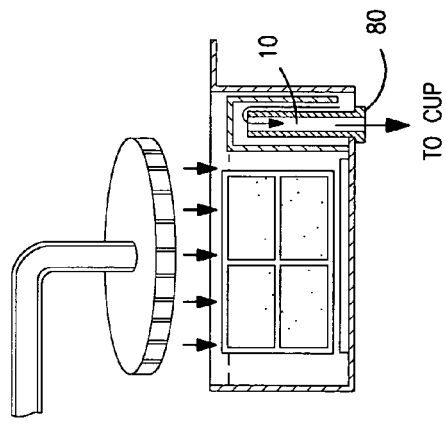
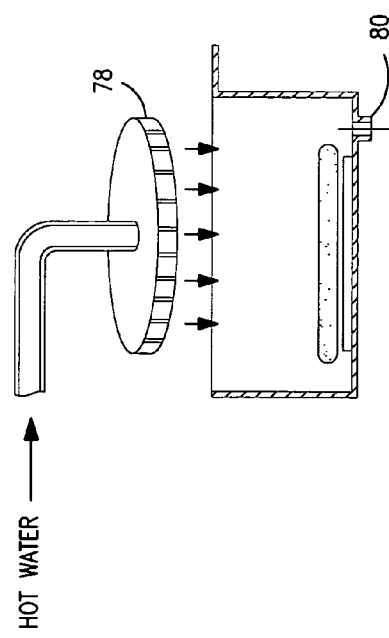
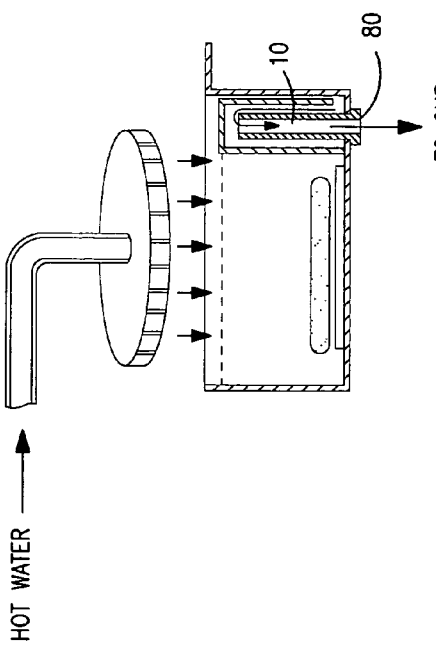

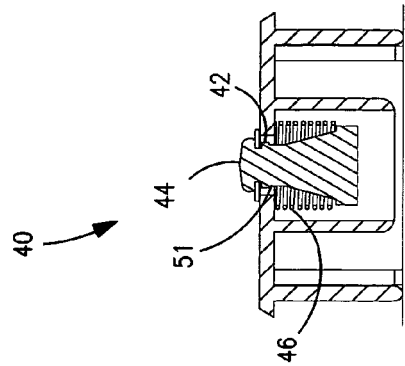
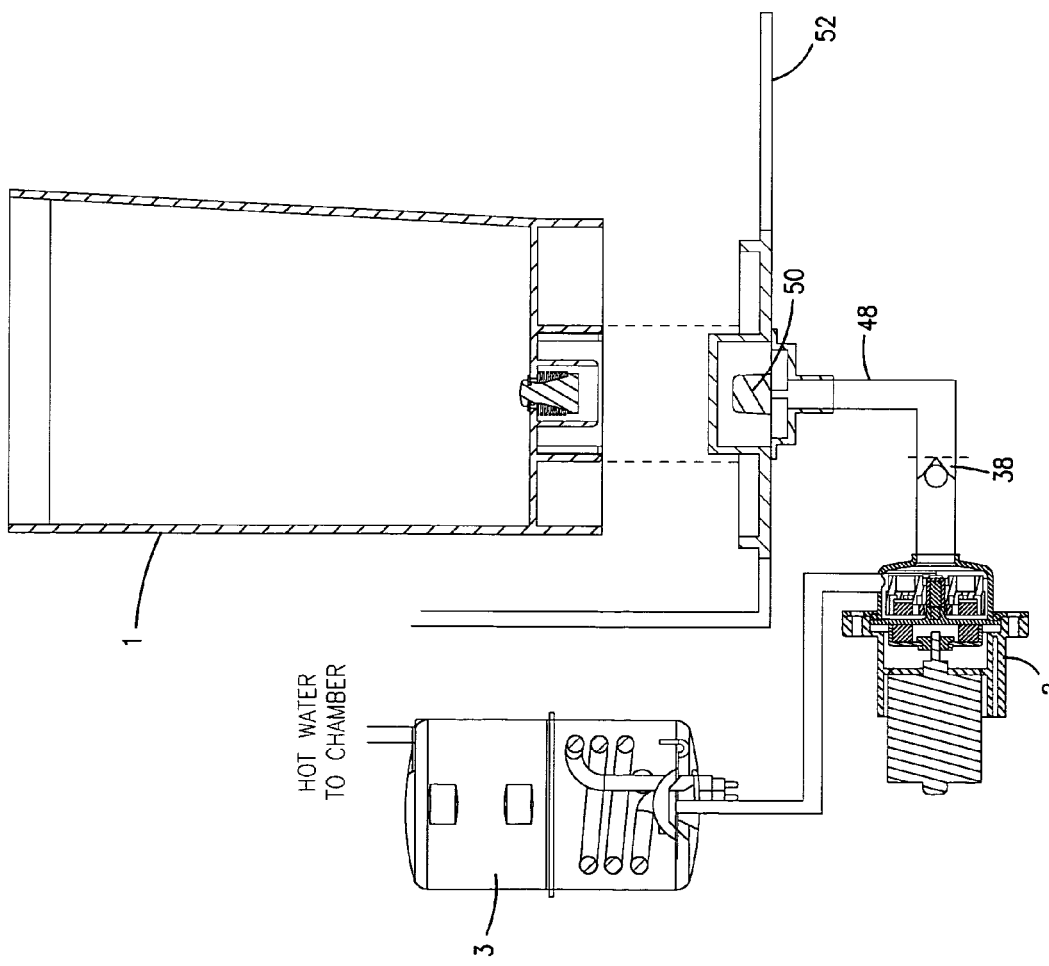
FIG. 10A
FIG. 10

HOT BEVERAGE MACHINE

FIELD OF THE INVENTION

The present invention relates to a home and/or commercial beverage machine in particular to a multifunctional coffee/tea machine.

BACKGROUND OF THE INVENTION

At present, there are a great variety of household and commercial appliances available for making beverages such as tea or coffee. However, in a majority of homes and commercial establishments there are a vast number of various consumer preferences that must be taken into account. Beverage consumers will have different predilections for not only types of beverages such as coffee or tea, but also for such things as beverage strength. It is well known in the brewing art that the brewing of different types and qualities of hot beverages requires different brewing conditions. Different beverages and varying qualities of beverages require such things as different brewing water volumes and flow rates, brewing times, and temperatures. For instance, the brewing of tea, such that a refined and pleasant beverage is produced, is often accomplished by steeping the tea in hot water for a set amount of time. Different types and forms of tea often require specific water temperatures and contact time of the water with the tea leaves. The same principles generally hold true with other beverages such as coffee where bean type, roasting, and grinding all may influence what brewing conditions are used.

In addition, the fast paced lifestyle in most urban areas, and the rapid expansion of establishments preparing hot beverages as their primary business has created a need to accommodate a variety of tastes over a short period of time. Contemporary appliances cannot adequately fill the need since they offer the user only the limited choice of selecting a single beverage at a time with a fixed quality of brew strength. Having several single application appliances has been conventionally used to address this problem. However, this has come at the cost of valuable counter space, and limits the ability of the user to vary the quality of the beverage efficiently.

SUMMARY OF THE INVENTION

Briefly stated, the invention in a preferred form is a multifunctional beverage machine designed for automatically making various kinds of hot drinks, such as coffee, tea, hot chocolate or soups. By using a microprocessor control system a multifunctional operation can be easily be achieved via a one-touch button. A removable water tank may be present to hold a sufficient capacity of water so that the machine can make many cups of various drinks without refilling. One or more independent brewing chambers may be present in the machine allowing it to make different kinds or different combinations of drinks in one operation. For example, making one cup of coffee and one cup of tea or one strong coffee and one mild coffee at the same time. The necessary adjustments for different water temperature, cup volume and brewing time can be programmed in a single control system with use of a microprocessor. Furthermore, the invention produces different kinds of hot drinks by simply switching between various styles of brewing chambers.

An object of the invention is to provide a new way of making various beverages in one system utilizing a pump and water boiler.

A further object of the invention is to make different kinds or different combinations of hot beverages in one operation.

Still another object of the invention is to use different types or styles of brewing chamber to make different drinks, such as coffee or tea.

A further object of the invention is to produce different temperatures of water and different volumes of water by the programmable microprocessor control system to optimize the quality of various kinds of hot drinks.

BRIEF DESCRIPTION OF THE DRAWINGS

Other objects and advantages of the invention will be evident to one of ordinary skill in the art from the following detailed description with reference to the accompanying drawings, in which:

FIGS. 9A–9D are schematic diagrams showing a variety of brewing chamber units consistent with the present invention.

FIG. 10 is a diagram showing a tank removed from the brewing system, 10A is an enlarged diagram of a closed tank valve consistent with the present invention.

DETAILED DESCRIPTION OF THE INVENTION

Figure 1:
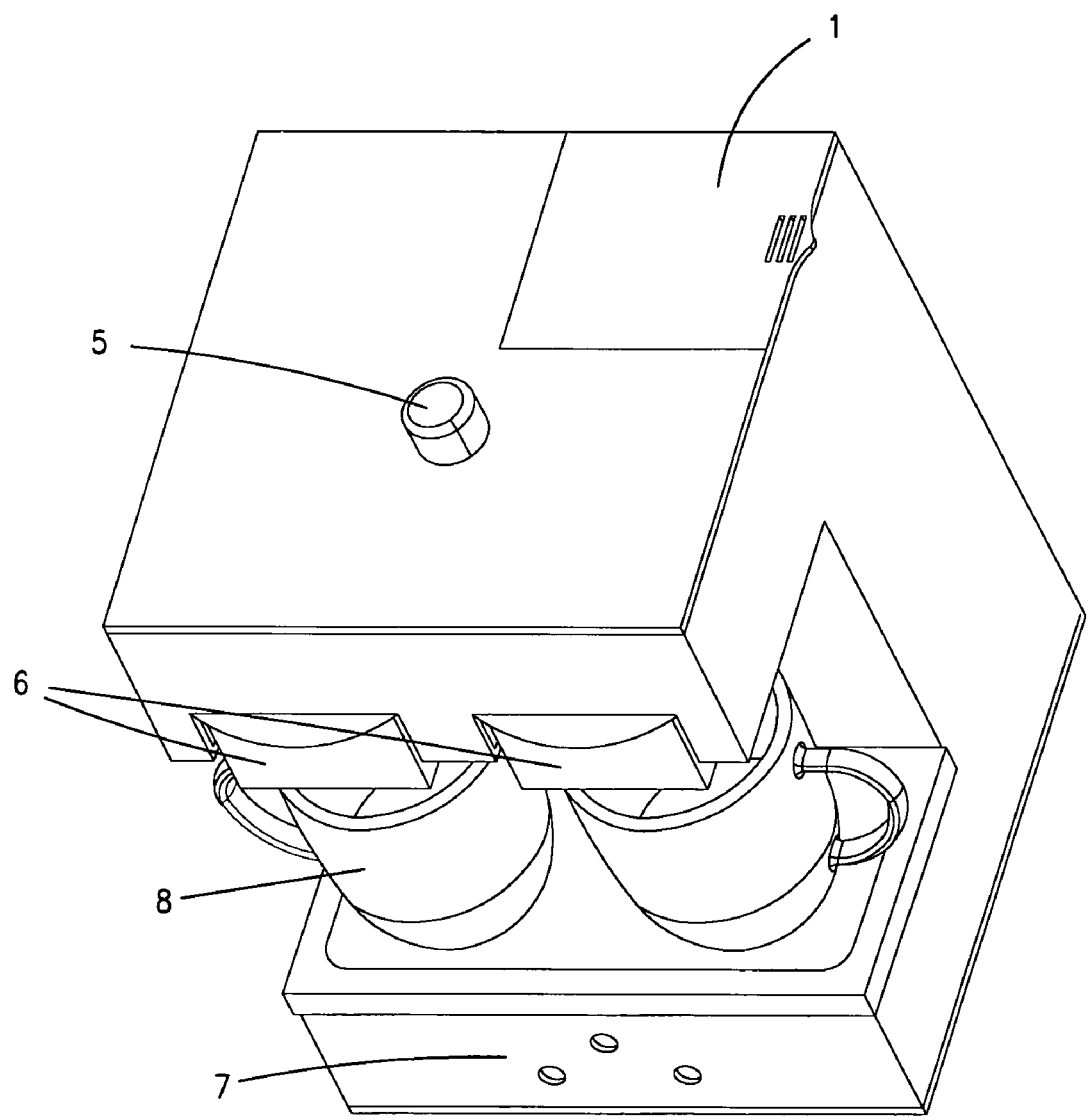
FIG. 1 is a perspective view of the exterior of a beverage machine consistent with the present invention.
Figure 2:
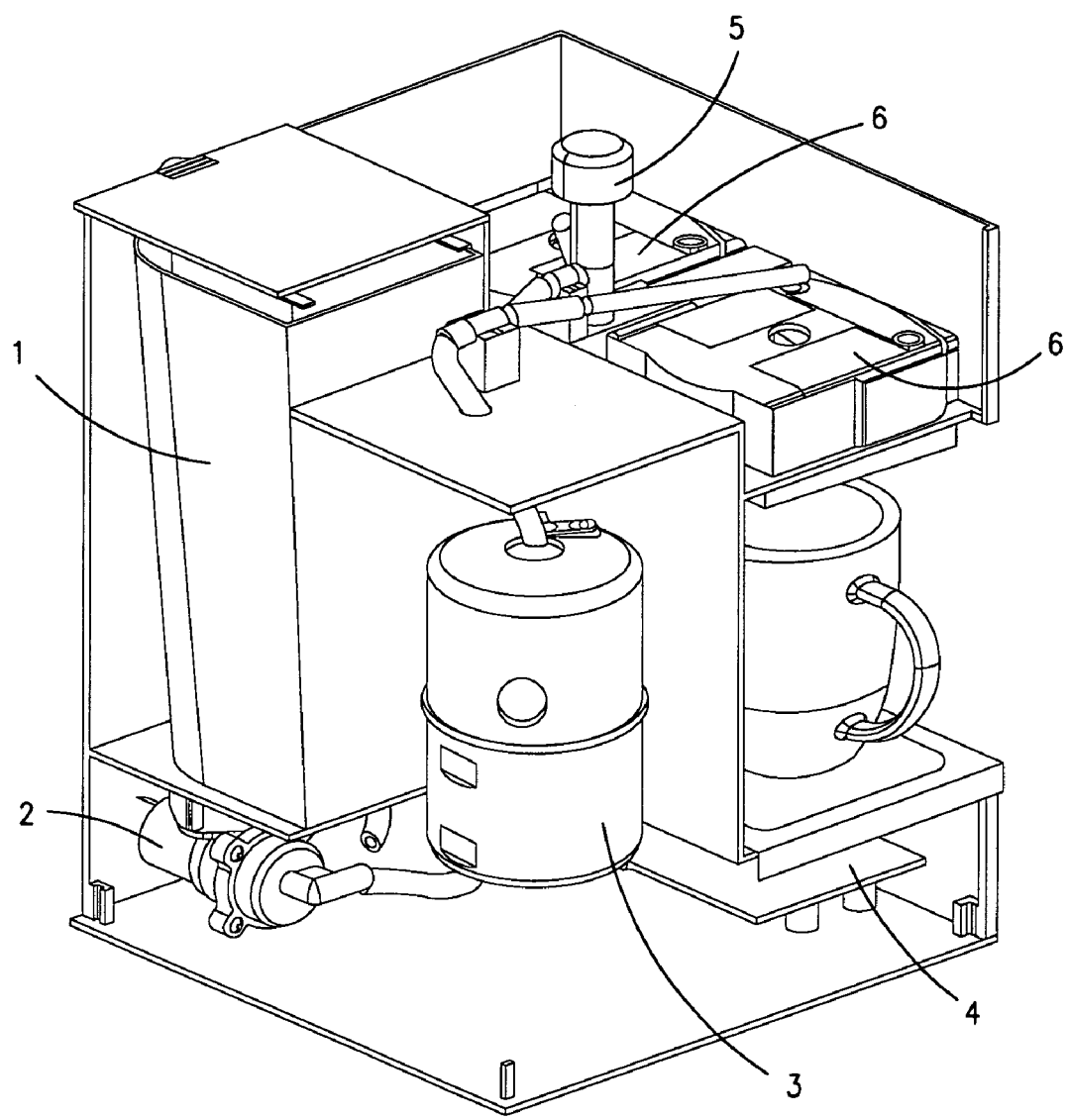
FIG. 2 is a perspective view of the interior of a beverage machine consistent with the present invention.
Figure 3C:
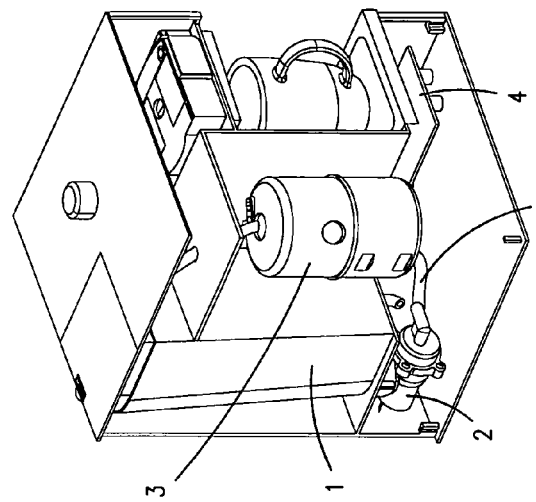
FIGS. 3A–3D are perspective views showing various interior and exterior aspects of a beverage machine from the bottom, side, rear, and front consistent with the present invention.
Figure 3D:
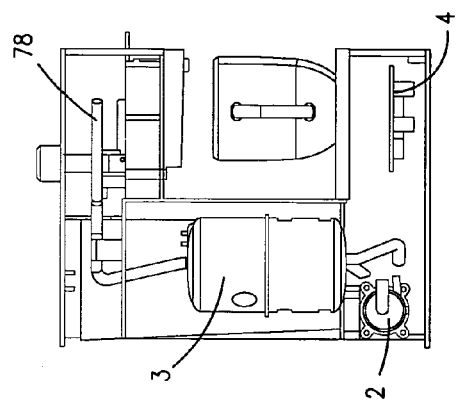
Figure 3A:
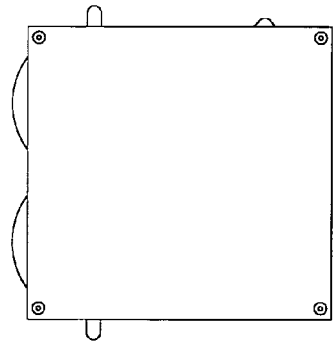
Figure 3B:
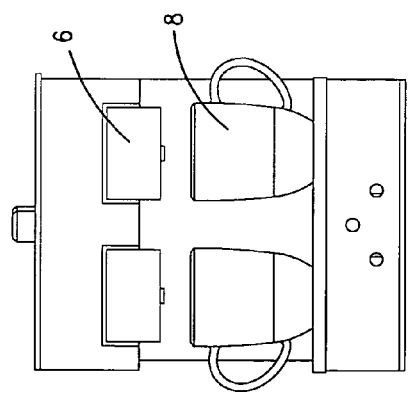

The invention, with reference to FIGS. 1–3, is generally related to a multifunctional beverage machine for automatically making various kinds of hot drinks, for example, coffee, tea, chocolate or soups. By using a microprocessor control unit 4, the operation of making single, multiple and differing hot drinks can easily be achieved via, for example, a one-touch button. In one embodiment of the invention, the apparatus has a removable water tank 1, which can hold a large amount of water, which allows the user to make numerous drinks without the need to refill the water tank frequently. There are two or more independent brewing chamber units 6 installed in the unit. This allows the machine to make different kinds or different combination of drinks in one operation. For example, the beverage machine can make one cup of coffee and one cup of tea or one cup of strong coffee and one cup of mild coffee at same time. To make the different kinds of drinks in this one machine, the water temperature, the cup volume, water pressure, volume, and the brewing time can be adjusted by the microprocessor control unit 4. In addition, the appliance can include various styles of brewing chamber units 6 used for producing different drinks. In another embodiment of the invention, there is a single brewing chamber unit 6, which can be configured to brew various beverages.

The apparatus in one embodiment may include removable tank 1, which can be removed from the unit for ease of cleaning and refilling. The tank 1 is configured to hold sufficient water so that the machine can make many cups of beverage without the need to refill frequently. For example, as shown in FIGS. 10, 10A, 11, and 11A, when the tank is removable there can be a drain hole 53 at the bottom of the removable tank 1, and a sealing valve mechanism 40 built into that area or fixed to that area prevents any water in the tank 1 from draining out. When the tank 1 is inserted into the base, a permanent fixture 50 at the platform of the base 52 will activate the valve. In one embodiment, the permanent feature 50 comes into contact with a valve pin 44, and as the tank 1 is lowered the valve pin moves upward through the valve guide 55. As the valve pin 44 is pushed upward, the valve seal 42, which is fixed on the valve pin 44, will rise above the seating surface 51 of the outlet hole 53 to allow the water to drain through the hole into pipe duct 48 to the heating system 3. When the Tank is removed, a spring 46 in the valve mechanism 40 will force push or pull the valve pin 44 downward. The valve seal 42, which is fixed on the pin, will cover the outlet hole 53 to stop water from draining. In addition, a single way valve 38 is installed in the pipe duct 48. When the tank 1 is removed, water in the system is not able to flow back and leak out. A fixed/permanent water tank may optionally be present in one embodiment of the invention.

The tank 1 is connected to a water pump 2 in one embodiment of the invention. The pump 2 is used to pump the water from the water tank 1 into a boiler system 3 to make hot water. The pump may be comprised of a pump housing 62, a small DC motor 61, a pair of magnets 64 and an impeller 67.

The DC motor 61 can be operated by DC voltage at the range, for example, of about 6V to about 12V. Since the motor speed is related to the supplied voltage, the pump output flow rate can be simply controlled by varying the voltage (i.e. increase the voltage to achieve faster motor speed and flow rate, or reduce the voltage to have slower flow rate). Voltage may be controlled with the microprocessor 4. As the motor power in one embodiment of the invention is small and the propeller design simple (straight or single curve blade), water flow through the pump will generally not create high water pressure.

Figure 12C:
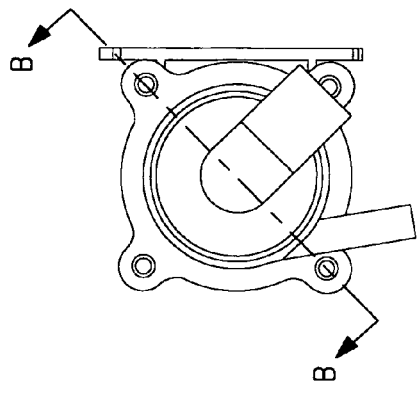
FIGS. 12A–12D shows exterior and cut away views of a pump consistent with the present invention.
Figure 12D:
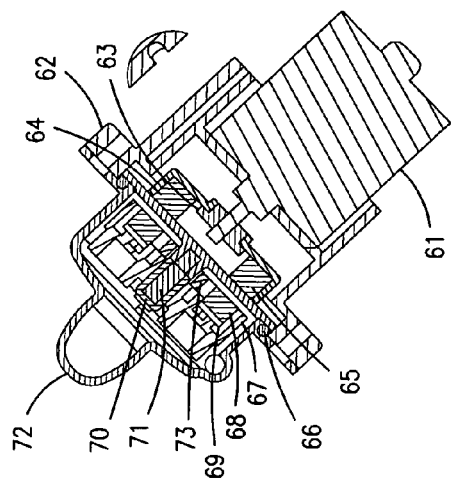
Figure 12A:
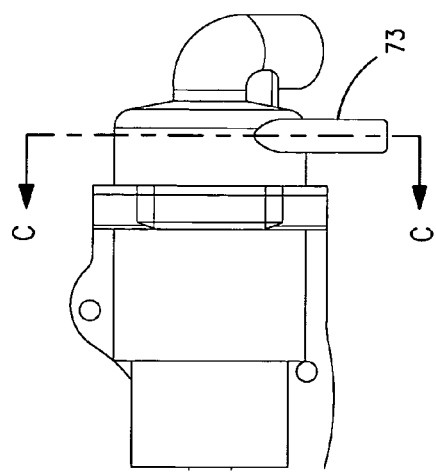
Figure 12B:
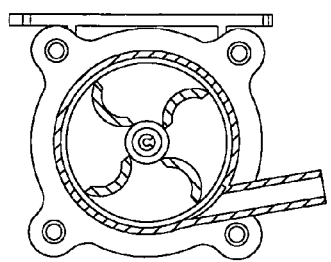

With reference to FIGS. 12A–12D wherein FIG. 12B is a view through section line C of FIG. 12A, and FIG. 12D is a view through section line B of FIG. 12C For the pump construction a DC motor 61 is mounted to the lower pump housing 62. A magnet 64 is fixed on the disc 63 which is connected to the motor shaft. The motor directly drives the magnet disc 63. A pump inner case 65 is located in between the upper portion and the lower portion of the pump housing. It is used to prevent water leakage from the upper portion of the pump housing to the lower portion in order to avoid damage to the DC motor 61. An O-ring 66 may be used as a seal between the upper and lower pump housing. Another magnet 68 is fixed at the bottom of the impeller 67, which is connected to the main shaft 71. When the motor rotates the lower magnet disc 63, the impeller 67 will also rotate to pump water via a coupling of magnetic force between the upper and lower magnets. Water flows into the pump from the inlet through the center of the pump housing 72 and is accelerated by the impeller out through the pipe duct 73 at the side.

The boiler system 3 may be constructed of a variety of materials well known in the art, and in a preferred form uses stainless steel for a majority of the material in contact with the liquid to be heated. The water is heated and then flows from the boiler 3 into the brewing chambers 6 to make the various types of drinks.

Figure 5:
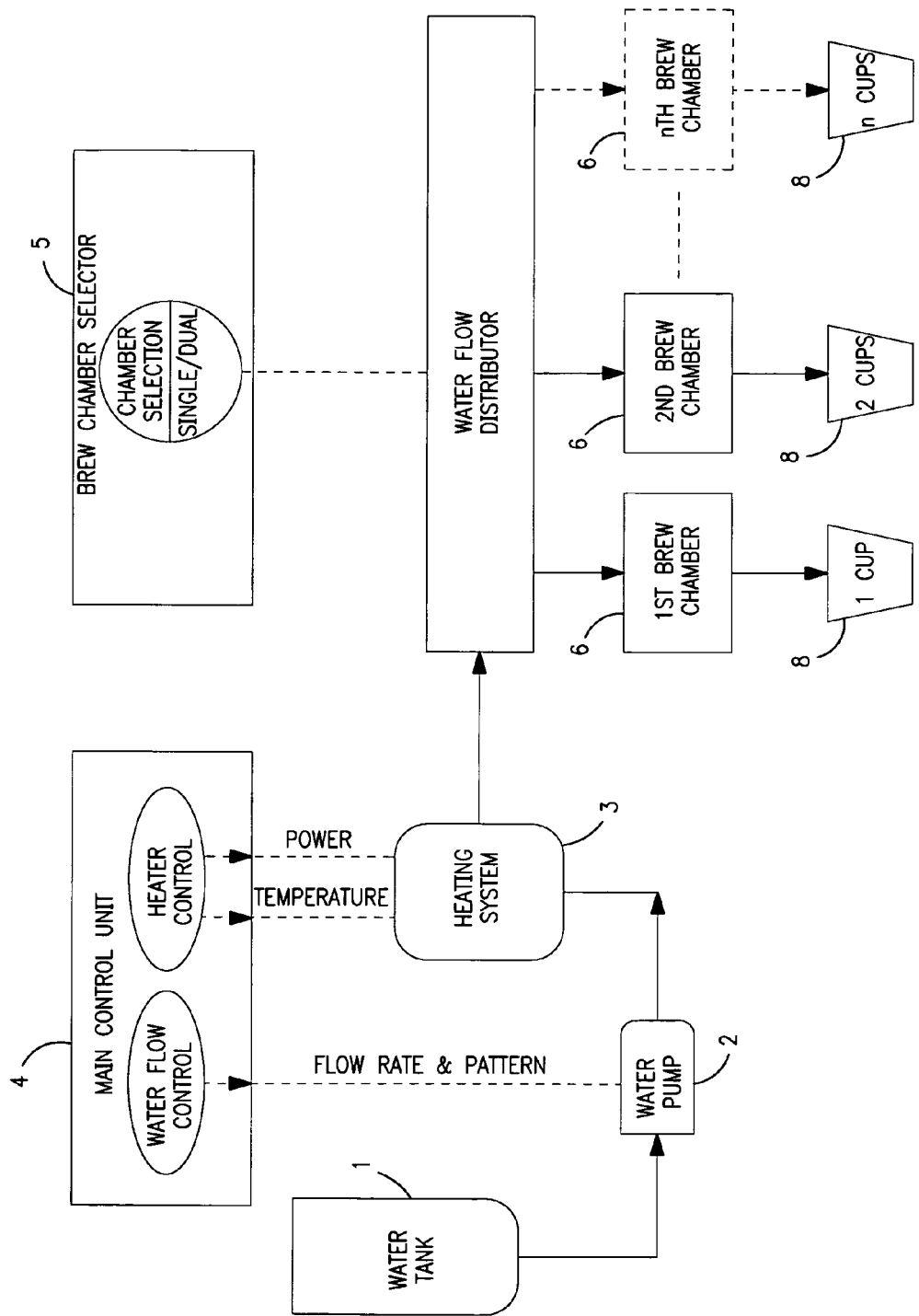
FIG. 5 is a block diagram of the relationship between various parts of a beverage machine consistent with the present invention.

A microprocessor unit 4 controls the boiler 3 so that the output temperature can be controlled. The microprocessor unit 4 may automatically control this process through cycling of current to the heating elements, and/or by, for instance, selectively energizing the heating elements. In one embodiment of the invention an electronic sensor 30, well known in the art, is installed inside of the boiler to monitor the water temperature. The sensor 30 sends the water temperature data back to the microprocessor unit 4 to manage/control the heater 3 operation. An example of the microprocessor control relationship can be seen in FIG. 5.

Figure 6:
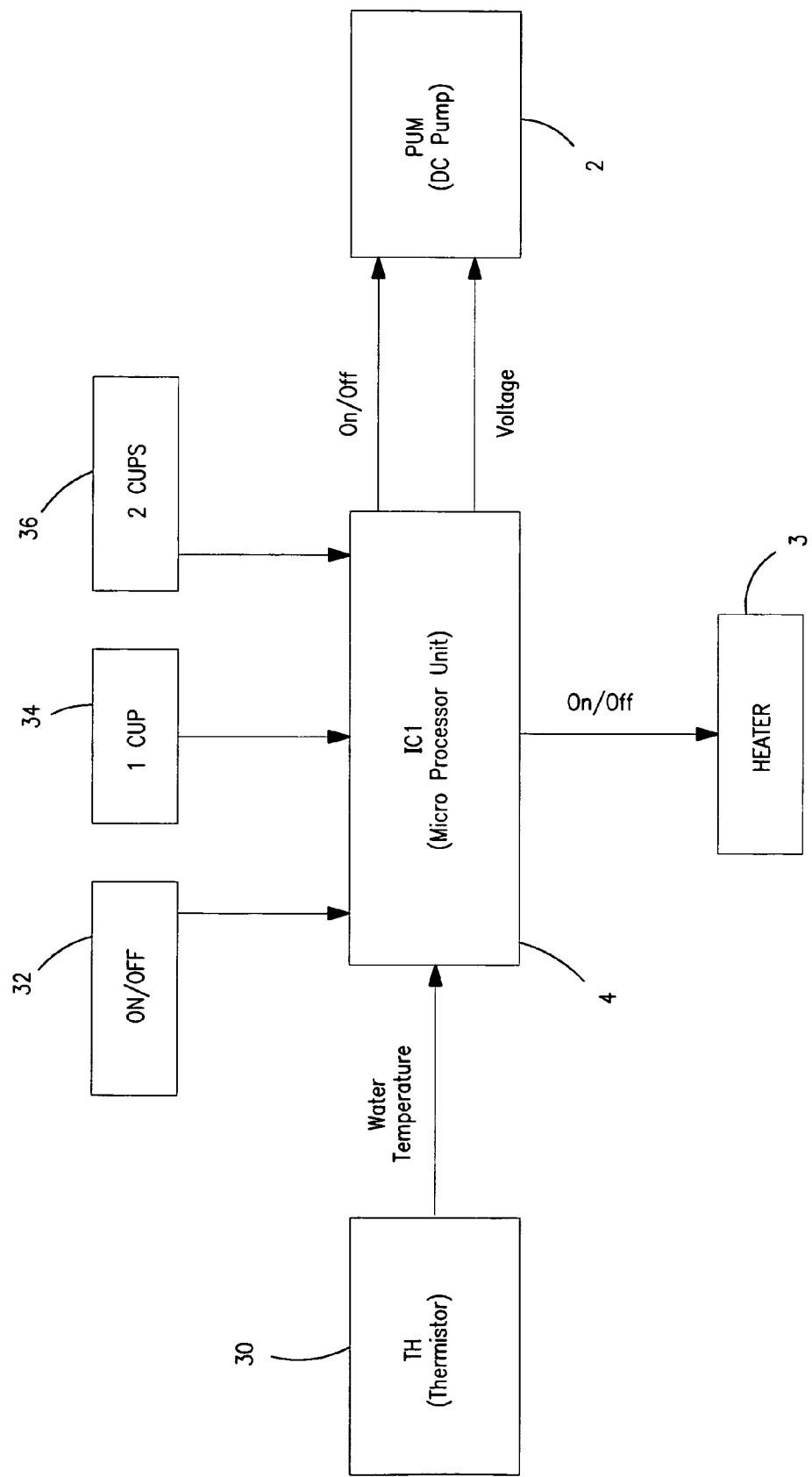
FIG. 6 is a diagram showing the relationship between the microprocessor and various parts of the beverage machine consistent with the present invention.
Figure 7:
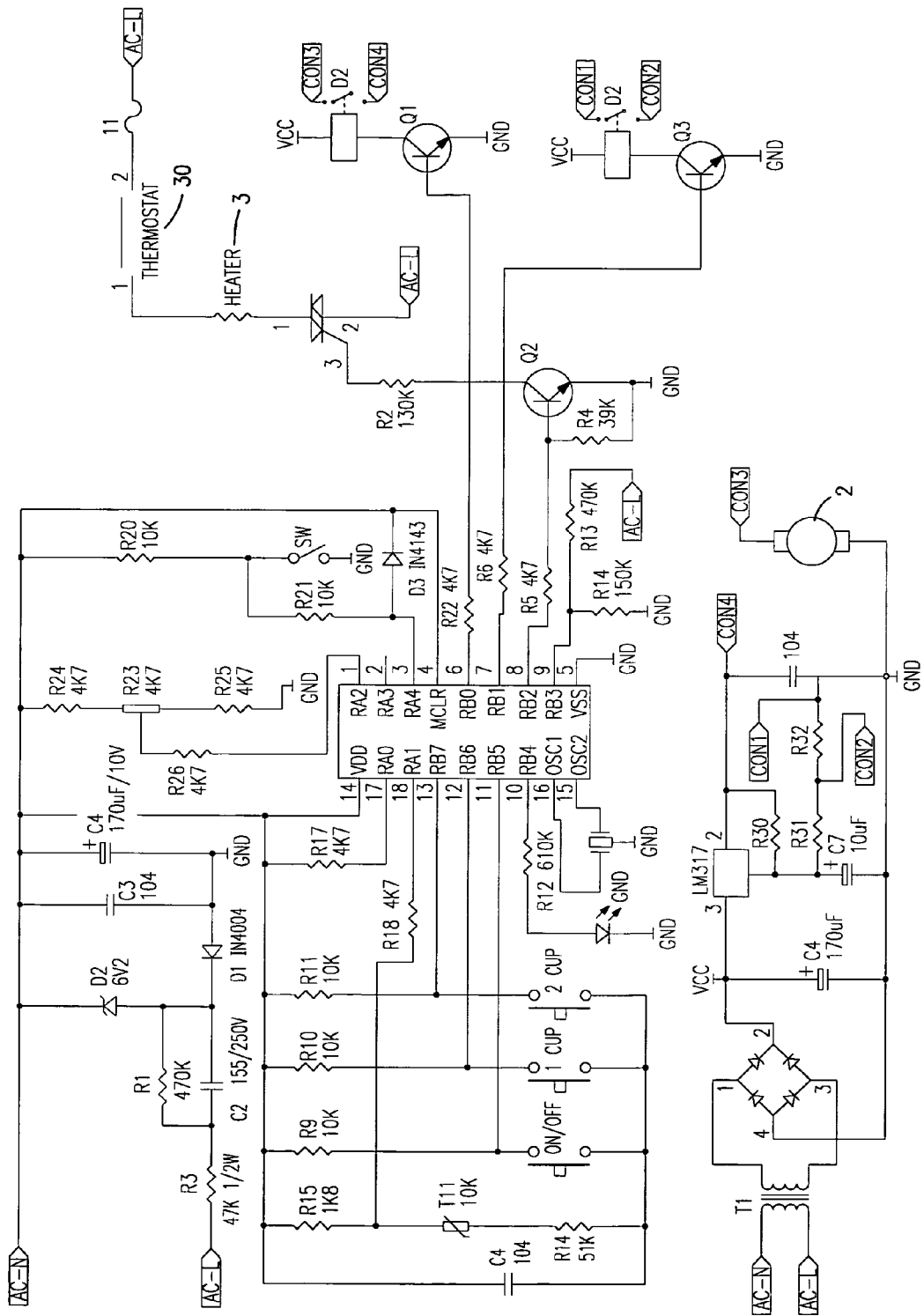
FIG. 7 is a circuit diagram of the microprocessor in a beverage machine consistent with the present invention.
Figure 8:
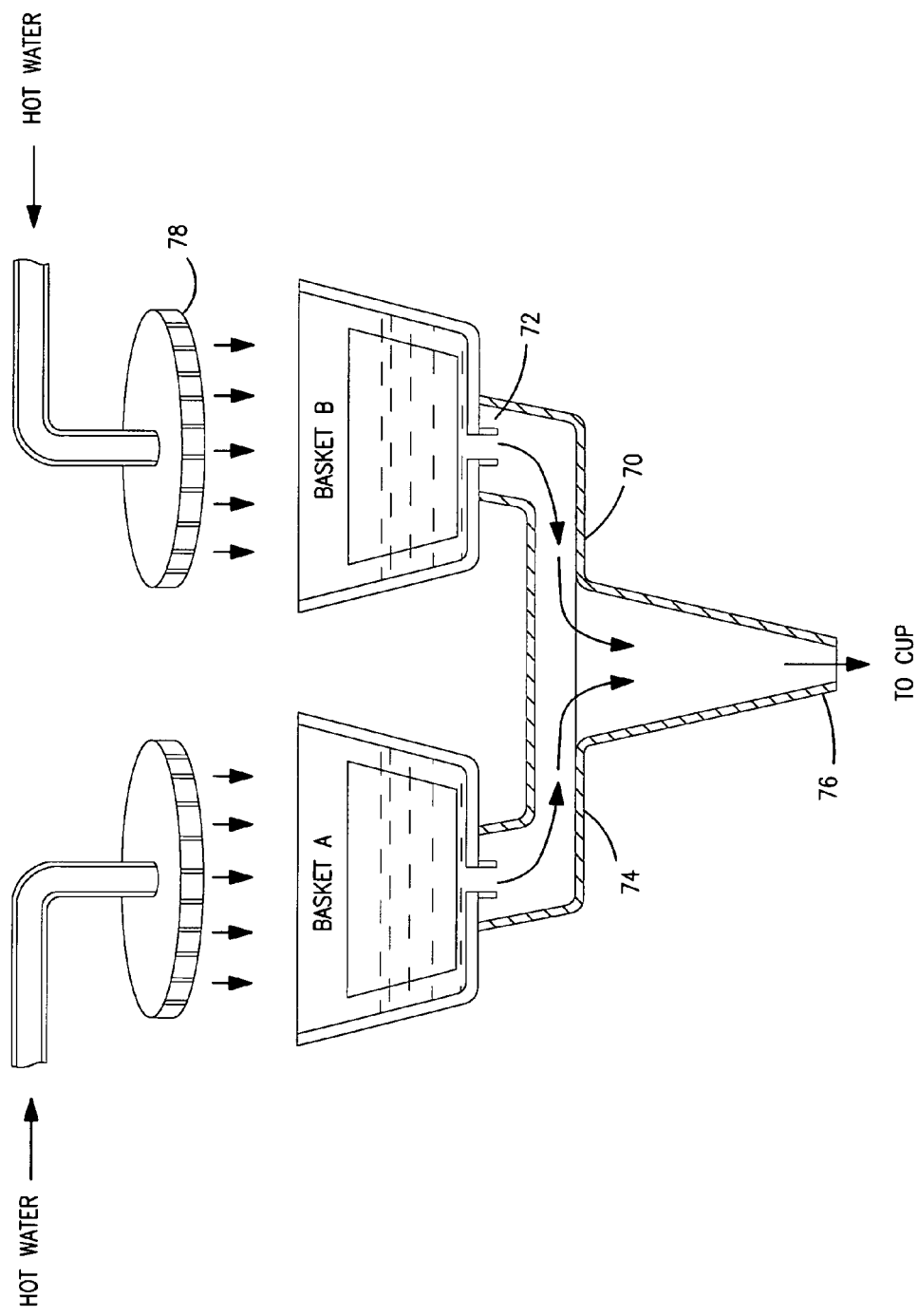
FIG. 8 is a schematic diagram showing an adapter for combining brewed beverages consistent with the present invention.
Figure 11A:
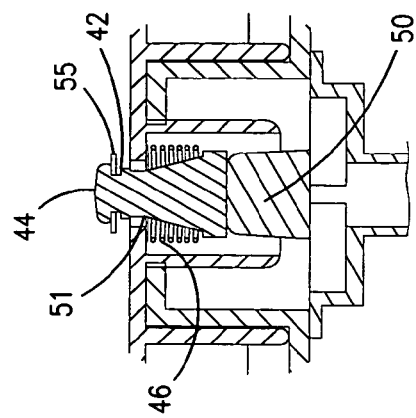
FIG. 11 is a diagram showing a tank engaged with the brewing system, a schematic of the water flow, and 11A is an enlarged diagram of a open tank valve consistent with the present invention.
Figure 11:
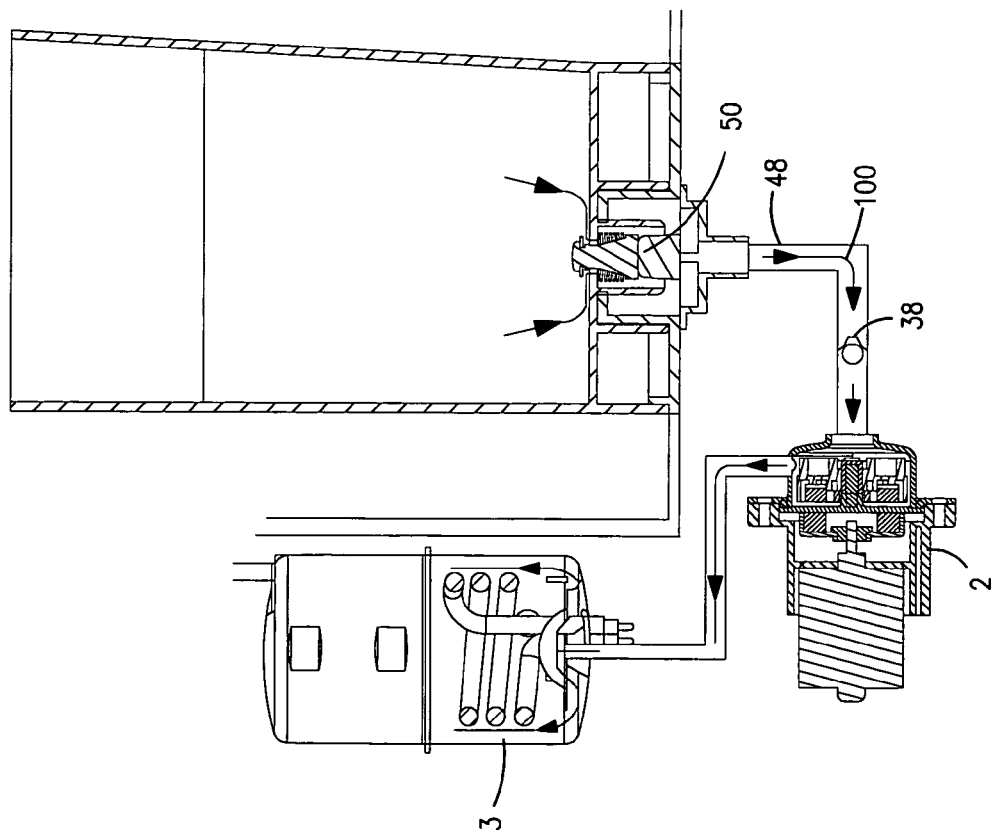

The circuit diagram of one embodiment of the invention is shown in FIG. 6. Wherein:

IC1 is Main Micro-processor; to control the Heater in the boiler 3 and Water Pump 2;
PUM is Motor 61 of water pump 2, DC 6–12V;
HEATER is Electrical Heater in the water boiler 3, AC 120V;
TH is Thermistor 30, to sense water temperature in the boiler 3 and send data to IC1 for heater control;
ON/OFF is Machine On/Off switch;
1 CUP is Switch, to make 1 cup of drink;
2 CUP is Switch, to make 2 cups of drink;
Con3 and Con4 is Pump connect to IC1, to control pump on/off;
Con1 and Con2 is Pump connect to IC1, to control pump motor voltage.

Since the heater function, in one embodiment of the invention, is automatically controlled by the microprocessor 4, the water inside of the boiler 3 is always maintained at an optimal temperature so that the machine is readily available to make hot drinks anytime. As water is pumped from the tank 1 in to the boiler 3, hot water is displaced into the brew chamber unit 6 through a flow selector 5 on top of the machine.

The flow selector 5 is used to control which brew chamber unit 6 the hot water should flow into. The flow selector 5 can either direct the water into one brew container to make a single cup of drink or into both brew containers at the same time to make 2 cups of drinks.

The brewing chamber unit 6, in one embodiment of the invention, has a location for a filter basket 9, and a suction tube unit 10. The brew chamber unit 6 is substantially rectangular, cylindrical, conical or otherwise shaped with an open top, and accepts a filter basket 9. The filter basket may have a majority of its surfaces made of a mesh or screen, or it may have surfaces from supporting a filter material. The filter basket 9 may be of a variety of configurations, for example as shown in FIGS. 9A–9D, to allow a user to brew different types of beverages, such as ground coffee, coffee bag, tea bag, tea leaf, chocolate or soup powder depending on the type of filter basket used/selected.

One type of filter basket 9 may be configured for coffee bags. In this example a coffee bag is placed in the filter basket 9 and then put into the machine to make coffee. Hot water is supplied into the brew chamber unit 6 through the shower plate 78 on the top of the chamber. The shower plate allows hot water to be evenly dispensed over and onto the bag to brew coffee. The brewed coffee then flows through the outlet hole 80 at the bottom of the brew chamber unit 6 and into the cup.

Ground coffee can also be brewed in another filter basket 9 configured for the purpose, for example, a permanent filter 82 is used to brew ground coffee. The shape of the filter basket 9 can be, for example, rectangular or cylindrical and receives ground coffee. The filter basket 9 is placed into the brewing chamber 6. Hot water is supplied into the filter water into the filter basket 9 through a shower plate 78 on the top. The shower plate allows hot water to be evenly dispensed onto the ground coffee to brew coffee. Once the water flows through the ground coffee, brewed coffee then flows through the outlet hole 80 at the bottom of the brew chamber unit 6 and into the cup.

In one embodiment of the invention, for example as shown in FIG. 3, the brewing chamber is configured for making hot tea using leaves or bags, a suction tube unit 10 is present inside of the "tea" brew container to allow for steeping of tea to occur. Steeping is, for instance, the full or partial submersion of tea leaves in hot water. Varying the amount of time that steeping occurs produces different qualities in the final beverage. Generally, the longer the steeping time the stronger the brew. During operation sufficient hot water is pumped into the brew chamber unit 6 such that the tea leaves or tea bags are completely submerged in the hot water. A delay period may then occur for additional steeping to take place. For example, 1 to 2 minutes may be allotted for additional steeping. The brewed tea is then dispensed from the brewing chamber 6 into a beverage receptacle.

Figure 4:
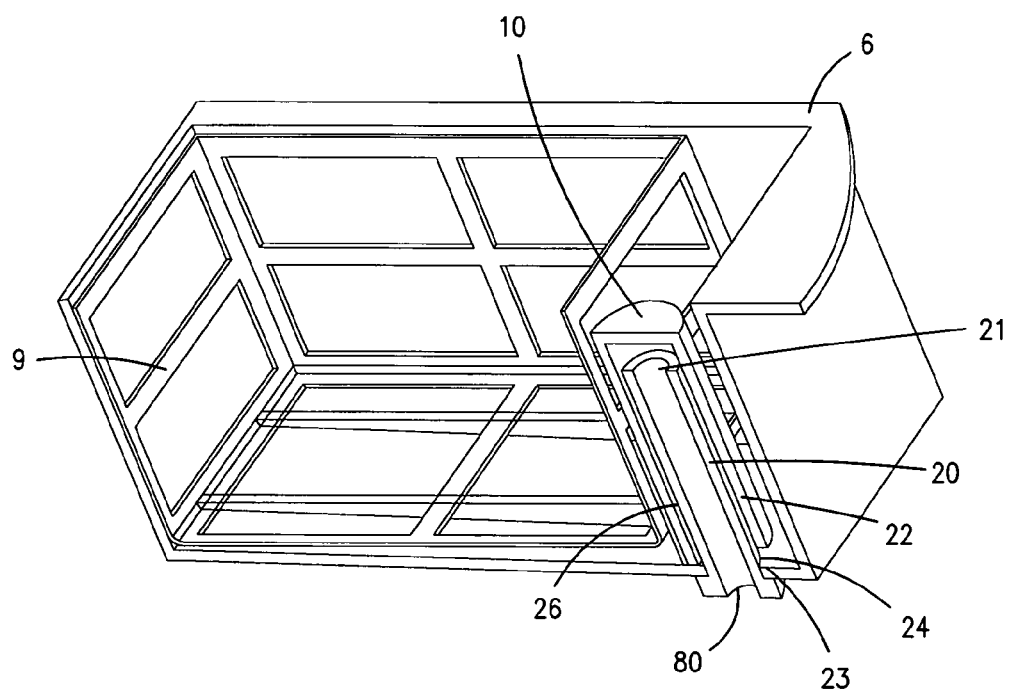
FIG. 4 is a perspective view of a brewing chamber unit consistent with the present invention.

Unlike the typical brewing of such things as coffee grounds or coffee bags where the hot water flows through the grounds, the water in tea brewing should remain in the brew chamber unit 6 for an extended period of time to allow the tea enough steeping time in order to achieve the desired taste. In one embodiment of the invention the hot water is retained by in the brew chamber unit 6 through use of a specially configured suction tube unit 10. The suction tube unit 10 in one embodiment, as shown in FIG. 4 has a hollow tube 20 extending upward from a base of the brewing chamber 6 and having a spillway 21 at its distal end. The hollow tube 20 may, in one embodiment of the invention, extend through the side of the brew chamber unit 6. The hollow tube 20, has an outer cover 22 spaced from the exterior of the hollow tube. The outer cover is fixed to the brewing chamber and/or at a portion(s) of the hollow tube. The outer cover 22 encloses the hollow tube spillway 21 and extends back down to the base 23 of the brewing chamber 6. An opening 24 in the outer cover 22 is present at or near the base of the brewing chamber 6. The opening 24 leads into the space 26 between the outer cover 22 and the exterior of the tube 20.

In operation, the brew chamber unit 6 has a filter basket 9 containing, for example, tea leaves and is filled with hot water dispensed from the shower plate 78. The hot water submerses the tea leaves as the water level rises, and at the same time water passes into the suction tube unit 10 through the opening 24 in the outer cover and rises up the exterior of the tube 20. When the water reaches the spillway 21, it flows over and down through the interior of the tube 20. This creates a siphoning effect such that as the water flows down through the tube 20 it pulls water from the brewing chamber into the tube 20 and out an opening 80 which extends downward from the base 23. The beverage may be collected in, for instance, cups 8. The suction for the siphoning effect is broken, and beverage flow ceases, when the level of water in the brew chamber unit 6 falls to a level of the opening 24 and air is allowed to enter. The steeping time can be dependent on at least the time required to fill the brewing chamber 6 and the time before sufficient water is added to pass over the spillway 21.

In one embodiment of the invention, there is more than one brewing chamber 11 present. Each of the brewing chambers 11 have an outlet 80 through which a brewed beverage may pass into a beverage container such as a carafe, cup, mug, glass, flask, bottle, thermos, or other container well known in the art. In one embodiment of the invention there may be an adapter 70 to make mix drink. The adapter has, for example, at least two inlets 72, a manifold 74 connecting the inlets and an outlet 76. In the case where the machine is able to make two different kinds of drinks at the same time, the adapter 70 is designed to mix the drinks together and then output the beverage into a cup. A typical example of such a mixed drink is Mocha (Coffee+Chocolate).

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. An apparatus for making heated beverages comprising;
   a heating element having a liquid storage portion configured to heat a volume of liquid to a desired temperature and to store the heated volume of liquid for a desired period of time;
   a pump;
   a flow selector;
   a liquid reservoir;
   at least one brewing chamber unit having an inlet and an outlet;
   a liquid pathway, in fluid communication with said pump, extending from the liquid reservoir through the heating element to the flow selector, and into at least one brewing inlet; and
   a microprocessor electrically connected to the pump, and heating element for controlling the operation of the pump and the heating element.

2. The apparatus for making heated beverages of claim 1, wherein the flow selector is controlled by the microprocessor such that liquid is directed from the heating element to at least one brewing chamber.

3. The apparatus for making heated beverages of claim 1, wherein at least one of the brewing chamber units has a filter basket.

4. The apparatus for making heated beverages of claim 1, wherein at least one of the brewing chamber units comprises a filter basket and a suction tube, said suction tube unit defines the brewing chamber outlet.

5. The apparatus for making heated beverages of claim 1, wherein the microprocessor is electrically connected to a temperature sensor on the heating element.

6. The apparatus for making heated beverages of claim 1, wherein there are at least two brewing chambers and the outlets of the brewing chambers are fluidly connected to a single beverage container.

7. The apparatus for making heated beverages of claim 1, wherein the microprocessor controls a volume, a pressure and a temperature of a liquid in the liquid pathway.

8. The apparatus for making heated beverages of claim 1, further including a shower plate for dispensing water into the brewing chamber.

9. The apparatus for making heated beverages of claim 1, wherein the flow selector selectively interrupts the liquid pathway.

10. The apparatus for making heated beverages of claim 1, wherein the liquid reservoir is a removable tank.

11. The apparatus for making heated beverages of claim 1, wherein the heating element has a liquid contact interface that is substantially stainless steel.

12. The apparatus for making heated beverages of claim 1, wherein there are at least two brewing chambers.

13. The apparatus for making heated beverages of claim 12, wherein there is a tea brewing chamber and a coffee brewing chamber.

14. The apparatus for making heated beverages of claim 10, wherein the removable tank has a valve mechanism comprising:
    a valve having a valve seal fixed to a valve pin;
    a valve guide;
    a valve seating surface;
    a spring attached to the valve to provide retentive force between the valve seal and the valve seating surface.

15. The apparatus for making heated beverages of claim 1, wherein the pump has a magnetic coupling between a drive motor and an impeller.

16. An apparatus for making heated beverages comprising:
    a heating element;
    a pump;
    a flow selector;
    a liquid reservoir;
    at least one brewing chamber unit having an inlet and an outlet, wherein at least one of the brewing chamber units comprises a filter basket and a suction tube, said suction tube unit defines the brewing chamber outlet
    wherein the suction tube unit further comprises: a hollow tube defining the brewing chamber outlet on a first end and a spillway on a second end; an outer cover spaced from and fixed in position surrounding the hollow tube, said outer cover having an opening spaced above the hollow tube first end;
    a liquid pathway, in fluid communication with said pump, extending from the liquid reservoir through the heating element to the flow selector, and into at least one brewing inlet; and
    a microprocessor electrically connected to the pump, and heating element for controlling the operation of the pump and the heating element.

* * * * *